United States Patent [19]

Königer et al.

[11] Patent Number: 6,107,362

[45] Date of Patent: Aug. 22, 2000

[54] RADIATION-CURABLE MATERIALS BASED ON EPOXIDE (METH) ACRYLATES

[75] Inventors: Rainer Königer, Ludwigshafen; Wolfgang Paulus, Mainz; Wolfgang Reich, Maxdorf; Erich Beck, Ladenburg; Lothar Wolf, Torno, all of Germany

[73] Assignee: BASF Aktiengesellschaft, Ludwigshafen, Germany

[21] Appl. No.: 09/184,113

[22] Filed: Nov. 2, 1998

[30] Foreign Application Priority Data

Dec. 2, 1997 [DE] Germany .............................. 197 53 322

[51] Int. Cl.[7] .......................... C08G 65/02; C08G 59/17; C08F 2/46; C08L 63/00
[52] U.S. Cl. .......................... 522/103; 522/100; 522/182; 528/393; 528/405; 528/406
[58] Field of Search ...................................... 522/103, 100, 522/170, 182; 528/366, 393, 405, 406

[56] References Cited

U.S. PATENT DOCUMENTS

| 4,180,474 | 12/1979 | Schuster et al. . |
| 5,096,938 | 3/1992 | Beck et al. . |
| 5,395,900 | 3/1995 | Liaw et al. . |
| 5,602,191 | 2/1997 | Reich et al. . |

FOREIGN PATENT DOCUMENTS

| 0 037 054 | 10/1981 | European Pat. Off. . |
| 0 126 341 | 11/1984 | European Pat. Off. . |
| 0 127 766 | 12/1984 | European Pat. Off. . |
| 0 279 303 | 8/1988 | European Pat. Off. . |
| 0 511 860 | 11/1992 | European Pat. Off. . |
| 0 686 621 | 12/1995 | European Pat. Off. . |
| 42 28 293 | 3/1994 | Germany . |

*Primary Examiner*—Susan Berman
*Attorney, Agent, or Firm*—Oblon, Spivak, McClelland, Maier & Neustadt, P.C.

[57] ABSTRACT

A mixture of acrylic or methacrylic compounds, containing from 40 to 95% by weight, based on the total amount of the acrylic or methacrylic compounds, of epoxide (meth) acrylates, is obtainable by a process comprising the process steps a) esterification of hydroxy compounds with acrylic acid or methacrylic acid, b) if required, subsequent addition of further acrylic acid or methacrylic acid and c) subsequent reaction of the excess acrylic or methacrylic acid with epoxides in the presence of the esterification product of a).

14 Claims, No Drawings

RADIATION-CURABLE MATERIALS BASED ON EPOXIDE (METH) ACRYLATES

The present invention relates to a mixture of acrylic or methacrylic compounds, containing from 40 to 95% by weight, based on the total amount of acrylic or methacrylic compounds, of epoxide (meth)acrylates, wherein the mixture is obtainable by a process comprising the process steps a) esterification of hydroxy compounds with acrylic acid or methacrylic acid, b) if required, subsequent addition of further acrylic acid or methacrylic acid and c) subsequent reaction of the excess acrylic or methacrylic acid with epoxides in the presence of the esterification product of a).

The present invention furthermore relates to a process for the preparation of the mixtures and radiation-curable materials which contain the mixtures.

Radiation-curable materials based on epoxide (meth) acrylates are known. Since the viscosity of the epoxide (meth)acrylates is very high, reactive diluents (low-viscosity, radiation-curable compounds) are frequently added in order to achieve good leveling required for use, for example as a coating material. It is desirable to keep the amount of reactive diluent small. Radiation-curable materials based on epoxide (meth)acrylates generally lead to hard but also brittle coatings. Higher flexibility and elasticity in addition to great hardness would therefore be advantageous.

EP-A-126 341 and EP-A-127 766 disclose processes for esterifying acrylic acid or methacrylic acid with hydroxy compounds, in which the acrylic acid or methacrylic acid is used in excess. The excess (meth)acrylic acid is not removed but is reacted with epoxides. The mixture obtained therefore contains minor amounts of epoxide (meth)acrylates. The purpose of the process is to convert (meth)acrylic acid as completely as possible and to avoid unnecessary working up for removal of the (meth)acrylic acid.

It is an object of the present invention to provide radiation-curable materials based on epoxide (meth) acrylates, these radiation-curable materials having a very low viscosity and giving coatings having great hardness and good elasticity.

The have found that this object is achieved by the mixture defined above, a process for its preparation and radiation-curable materials which contain the mixture.

The novel mixture contains from 40 to 95, preferably from 50 to 95, particularly preferably from 60 to 95, very particularly preferably from 70 to 95, % by weight of epoxide acrylates or epoxide methacrylates (in short epoxide (meth)acrylates), based on the total amount of the acrylic or methacrylic compounds.

Instead of 95% by weight, the maximum content of epoxide (meth)acrylates in the abovementioned weight ranges may also be 90, in particular 85 or 80, % by weight.

An epoxide (meth)acrylate is considered to be a compound which contains at least one reaction product of an epoxy group with acrylic acid or methacrylic acid.

The novel mixture is obtainable by the process defined at the outset and comprising process steps a) to c).

It is preferably a one-pot process, ie. a process in which the intermediates are not isolated.

In process step a), hydroxy compounds are esterified with acrylic acid or methacrylic acid, preferably using a molar excess of the acid, based on the moles of hydroxy groups. Acrylic acid is preferred.

The hydroxy compounds may be, for example, monohydric to decahydric, preferably monohydric to hexahydric, particularly preferably monohydric to pentahydric, alcohols.

For example, monoalcohols of one carbon atom, preferably 4 to 20 carbon atoms, are suitable, in particular alkanols, eg. butanol, 2-ethylhexanol, lauryl alcohol, cyclohexanol, trimethylcyclohexanol or 2-methyl-3-phenylpropanol, or alkoxylation products, in particular ethoxylation or propoxylation products of the monoalcohols with up to 10 mol of ethylene oxide, propylene oxide or mixtures thereof, based on 1 mol of monoalcohol.

Polyhydric alkanols having 2 to 20 carbon atoms and 2 to 6, preferably 2 to 4, hydroxyl groups, and alkoxylation products, in particular ethoxylation or propoxylation products of these alkanols with up to 20, preferably up to 10, particularly preferably up to 5, mol of an alkylene oxide, eg. ethylene oxide, propylene oxide or a mixture thereof, based on 1 mol of the polyhydric alkanol, are also particularly suitable.

Examples are ethylene glycol, propylene glycol, 1,4-butanediol, 1,5-pentanediol, neopentylglycol, 1,6-hexanediol, 2-methyl-1,5-pentanediol or 2-ethyl-1,4-butanediol, triols, such as glycerol, trimethylolpropane, trimethylolethane or trimethylolbutane, tetraols, such as pentaerythritol, pentaols and hexaols, eg. di-trimethylolpropane and di-pentaerythritol, and the corresponding ethoxylation or propoxylation products of these alcohols.

Other suitable hydroxy compounds are polyester polyols, as obtainable by reacting the above polyhydric alcohols, in particular diols, with polycarboxylic acids, in particular dicarboxylic acids.

The hydroxy compounds are esterified in process step a) with, preferably, at least 90, particularly preferably at least 110, mol % of acrylic acid or methacrylic acid, based on the moles of OH groups present in the hydroxy compounds. The esterification is preferably carried out in the presence of an acidic esterification catalyst, in the presence of a hydrocarbon which forms an azeotropic mixture with water and in the presence of a polymerization inhibitor.

The acidic esterification catalysts used are, for example, commercial inorganic or organic acids or acidic ion exchangers, sulfuric acid and p-toluenesulfonic acid being preferred. They are generally used in amounts of from 0.1 to 3% by weight, based on the mixture of (meth)acrylic acid and alcohol to be esterified.

The esterification can be carried out in the absence of a solvent or in a solvent. The esterification can be effected under azeotropic conditions at elevated temperatures, in general at from 40 to 120° C., preferably from 70 bis 115° C., hydrocarbons, such as aliphatic, cycloaliphatic or aromatic hydrocarbons or mixtures thereof, preferably those having a boiling range from 70 to 120° C., having proven particularly suitable as entraining agents for removing the water of reaction.

Suitable aliphatic hydrocarbons are, for example, hexane and its isomers and hydrocarbon mixtures having a boiling range from 60 to 95° C.

Particularly preferred entraining agents are cyclohexane, methyl cyclohexane and toluene. The amount of hydrocarbon added is not critical; depending on the apparatus used, the added amount by weight may vary from 0.1 to 2 times the amount of the reaction mixture comprising (meth)acrylic acid and hydroxy compound. A ratio of reaction mixture to hydrocarbon of from 1:0.20 to 1:0.8 is particularly advantageous.

Suitable polymerization inhibitors are, for example, those based on monohydric and polyhydric phenols, for example p-methoxyphenol, 2,6-di-tert-butyl-p-cresol, hydroquinone monomethyl ether and resorcinol monomethyl ether, and furthermore compounds of the thiodiphenylamine type (=phenothiazine) and tin(II) compounds. Combinations of phenol compound, phenothiazine and, if required, tin(II) compounds are advantageous. The compounds based on phenol are preferably used in amounts of from 0.05 to 1%, the tin(II) compounds in amounts of from 0.01 to 1% of Sn and phenothiazine in amounts of from 0.001 to 0.1%, based in each case on the esterification mixture comprising OH component and (meth)acrylic acid.

After the esterification, the solvent, for example the hydrocarbon, can be removed from the reaction mixture by distillation, if necessary under reduced pressure. The esterification catalyst can be neutralized in a suitable manner, for example by adding tertiary amines or alkali metal hydroxides.

In process step b), further acrylic acid or methacrylic acid may then be added.

Overall, the amount of acrylic acid or methacrylic acid in the novel process is preferably at least 120, particularly preferably at least 135, very particularly preferably at least 150, mol %, based on the total number of moles of OH groups of the hydroxy compounds present.

In general, the total amount of acrylic acid or methacrylic acid is not more than 400, in particular not more than 350, very particularly preferably not more than 300, mol %.

The amount of acrylic acid or methacrylic acid is such that the desired content of epoxide (meth)acrylates is reached.

The total amount of acrylic acid or methacrylic acid may also be completely used as early as in process step a). Acrylic acid is preferably used in the novel process. In process step c), the reaction with the epoxides is then carried out.

Preferred epoxides have from 1 to 5, particularly preferably 1 to 3, in particular 2, epoxy groups. The molecular weight of such compounds is preferably less than 2000, in particular less than 1100, particularly preferably less than 500, g/mol. Epoxides having an aromatic group, preferably a diphenyl group, are particularly suitable.

Examples of suitable epoxides are epoxidized olefins, glycidyl esters of saturated or unsaturated carboxylic acids or glycidyl ethers of aliphatic or aromatic polyols. Such products are commercially available in large numbers. Polyglycidyl compounds of bisphenol A and glycidyl ethers of polyfunctional alcohols, for example of butanediol, of glycerol and of pentaerythritol, are particularly preferred. Examples of such polyepoxy compounds are ®Epikote 812 (epoxide value: about 0.67) and Epikote 828 (epoxide value: about 0.53) and Epikote 162 (epoxide value: about 0.61) from Shell.

Specific examples are the following epoxy compounds:
Monoepoxides
cyclohexene oxide, cyclopentene oxide, 1,2-epoxy-p-vinylcyclohexane
Diepoxides
4-vinyl-1-cyclohexene diepoxide 1,4-cyclohexane dimethanol diglycidyl ether 1,4-butanediol diglycidyl ether neopentylglycol diglycidyl ether 3-(bis (glycidyloxymethyl)methoxy)-1,2-propanediol diglycidyl 1,2,3,6-tetrahydrophthalate 3,4-epoxycyclohexylmethyl 3,4-epoxycyclohexane carboxylate 3,4-epoxy-6-methylcyclohexylmethyl 3,4-epoxy-6-methylcyclohexanecarboxylate 1,2-diglycidylcyclohexane dicarboxylate bis (3,4-epoxycyclohexylmethyl) adipate 2-(3,4-epoxycyclohexyl-5,5-spiro-3,4-epoxy)cyclohexane-metadioxane
bisphenol A diglycidyl ether
bisphenol F diglycidyl ether
bisphenol H diglycidyl ether
Triepoxides
pentaerythritol triglycidyl ether Polymers or oligomers of the above compounds are also suitable.

The reaction with the epoxy compounds is preferably carried out at from 80 to 130° C., particularly preferably from 90 to 110° C., and is preferably continued until the reaction mixture has an acid number of less than 10, particularly preferably less than 5, mg KOH/g.

For example. quaternary ammonium or phosphonium compounds can be used as a catalyst for the reaction in step c).

The mixtures obtainable by the novel process are particularly suitable for use as materials which can be cured thermally, but preferably by high-energy radiation.

They can be used as or in coating materials, for example finishes, printing inks or adhesives, as printing plates, as moldings, for the production of photoresists, in stereolithography or as casting materials, for example for optical lenses.

For use as or in radiation-curable materials, additives such as crosslinking agents, thickeners, leveling agents or fillers or pigments, etc. may be added to the radiation-curable mixtures.

The novel mixtures or radiation-curable materials can be cured thermally, preferably by high-energy radiation, such as UV light or by electron beams.

For radiation curing by UV light, photoinitiators are usually added.

Examples of suitable photoinitiators are benzophenone and derivatives thereof, eg. alkylbenzophenones, halomethylated benzophenones, Michler's ketone and benzoin and benzoin ethers, such as ethylbenzoin ether, benzil ketals, such as benzil dimethyl ketal, acetophenone derivatives, e.g. hydroxy-2-methyl-1-phenylpropan-1-one and hydroxycyclohexyl phenyl ketone, anthraquinone and its derivatives, such as methylanthraquinone, and in particular acylphosphine oxides, eg. Lucirin® TPO (2,4,6-trimethylbenzoyldiphenylphosphine oxide).

The photoinitiators which, depending on the intended use of the novel materials, are employed in amounts of from 0.1 to 15, preferably from 1 to 10, % by weight, based on the polymerizable components, can be used as an individual substance or, owing to frequent advantageous synergistic effects, also in combination with one another.

In comparison with conventional epoxide (meth)acrylate-rich mixtures, the novel mixtures have a lower viscosity. Furthermore, the coatings obtained with the novel mixtures have good performance characteristics, in particular good elasticity and flexibility and also good hardness.

EXAMPLES

I Preparation of acrylate compounds
Mixture 1a 320 g of tripropylene glycol (TPG) were esterified with 288 g of acrylic acid. Acrylic acid was used in excess. 2.5 g of $H_2SO_4$ were used as the esterification catalyst. 203 g of methylcyclohexane were used as the entraining agent. The polymerization inhibitors comprised 0.5 g of 2,6-tert-butyl-p-cresol, 1.5 g of p-methoxyphenol, 0.015 g of phenothiazine, 0.5 g of triphenyl phosphite and 0.5 g of $H_3PO_2$.

Esterification temperature: 109–114° C.

Esterification time: 4.5 hours 15 g of 75% strength tetrabutylammonium bromide solution were then added. The methylcyclohexane was then distilled off under reduced pressure and at 75–110° C.

An acid number (AN) of 240 was then established with 212 g of acrylic acid.

The excess acrylic acid was then reacted with 540.5 g of Epikote 828 (bisphenol A diglycidyl ether). Temperature: 100–105° C. The reaction was carried out until AN<6.

The end product contained 73% by weight of epoxide acrylates. The content of epoxide acrylates was determined by the decrease in the acid number.

Mixture 1b 320 g of tripropylene glycol (TPG) were esterified with 288 g of acrylic acid. Acrylic acid was used in excess. 2.5 g of $H_2SO_4$ were used as the esterification catalyst. 203 g of methylcyclohexane were used as the entraining agent. The polymerization inhibitors comprised 0.5 g of 2,6-tert-butyl-p-cresol, 1.5 g of p-methoxyphenol, 0.015 g of phenothiazine, 0.5 g of triphenyl phosphite and 0.5 g of $H_3PO_2$.

Esterification temperature: 105–110° C.

Esterification time: 5 hours 15 g of 75% strength tetrabutylammonium bromide solution were then added. The methylcyclohexane was then distilled off under reduced pressure and at 75–110° C.

An acid number (AN) of 260 was then established with 223 g of acrylic acid.

The excess acrylic acid was then reacted with 557 g of Epikote 828. Temperature: 100–105° C. The reaction was carried out until AN<6.

Comparison C1

By mixing the components, a mixture of 30% by weight of tripropylene glycol diacrylate (TPGDA) and 70% by weight of bisphenol A diglycidyl diacrylate was prepared.

Mixture 2a 277 g of dipropylene glycol (DPG) were esterified with 358 g of acrylic acid. Acrylic acid was used in excess. 2.5 g of $H_2SO_4$ were used as the esterification catalyst. 211 g of methylcyclohexane were used as the entraining agent. The polymerization inhibitors comprised 0.5 g of 2,6-tert-butyl-p-cresol, 1.5 g of p-methoxyphenol, 0.015 g of phenothiazine, 0.5 g of triphenyl phosphite and 0.5 g of $H_3PO_2$.

Esterification temperature: 109–114° C.

Esterification time: 4 hours 15 g of 75% strength tetrabutylammonium bromide solution were then added. The methylcyclohexane was then distilled off under reduced pressure and at 75–110° C. An acid number (AN) of 275 was then established with 188 g of acrylic acid. The excess acrylic acid was then reacted with 590 g of Epikote 828. Temperature: 100–105° C. The reaction was carried out until AN<6.

Mixture 2b 277 g of dipropylene glycol (DPG) were esterified with 358 g of acrylic acid. Acrylic acid was used in excess. 2.5 g of $H_2SO_4$ were used as the esterification catalyst. 211 g of methylcyclohexane were used as the entraining agent. The polymerization inhibitors comprised 0.5 g of 2,6-tert-butyl-p-cresol, 1.5 g of p-methoxyphenol, 0.015 g of phenothiazine, 0.5 g of triphenyl phosphite and 0.5 g of Esterification temperature: 105–110° C.

Esterification time: 4.5 hours 15 g of 75% strength tetrabutylammonium bromide solution were then added. The methylcyclohexane was then distilled off under reduced pressure and at 75–110° C.

An acid number (AN) of 315 was then established with 249 g of acrylic acid.

The excess acrylic acid was then reacted with 729 g of Epikote 828. Temperature: 100–105° C. The reaction was carried out until AN<6.

Comparison C2

A mixture of 30% by weight of DPGDA and 70% by weight of Epa 520 was prepared by mixing.

II Testing of performance characteristics

The pendulum hardness was determined according to DIN 53157 and is a measure of the hardness of the coating. It is stated in seconds (s), high values indicating great hardness.

The Erichsen cupping was determined according to DIN 53156 and is a measure of the flexibility and elasticity. It is stated in millimeters (mm), high values indicating high flexibility.

The belt speed (m/min) with which a liquid coating film, applied to white paper, can be passed under an undoped high pressure mercury lamp (power: 120 W/cm lamp length; distance from lamp to substrate 12 cm) in order to obtain a firmly adhering coating which is scratch-resistant to the fingernail is a measure of the reactivity. The liquid coating films were applied with a 100 μm coil coater.

TABLE

Results

| Mixture | % by weight of epoxide acrylate | Viscosity (mPas) | Reactivity (m/min) | Erichsen cupping (mm) | Pendulum damping (sec) |
|---|---|---|---|---|---|
| C1* | 70 | 7800 | 5 | 1.7 | 182 |
| 1a | 73 | 5900 | 5 | 4.5 | 125 |
| 1b | 64 | 4800 | 5 | 3.5 | 169 |
| C2* | 70 | 5400 | 5 | 1.5 | 195 |
| 2a | 66 | 3600 | 5 | 3.1 | 144 |
| 2b | 71 | 6400 | 5 | 3.4 | 143 |

*for comparison

We claim:

1. A mixture of acrylic or methacrylic compounds, containing from 40 to 95% by weight, based on the total amount of acrylic or methacrylic compounds, of epoxide (meth) acrylates, obtained by reacting acrylic or methacrylic acid with an epoxide in the presence of an esterification product of a hydroxy compound with the same acrylic or methacrylic acid.

2. A mixture as claimed in claim 1, wherein the content of epoxide (meth)acrylates is from 70 to 95% by weight, based on the total amount of acrylic or methacrylic compounds.

3. A mixture as claimed in claim 1, wherein said epoxides have from 2 to 4 epoxy groups.

4. A mixture as claimed in claim 1, wherein said epoxides have at least one aromatic group and a molecular weight of less than 500 g/mol.

5. A mixture as claimed in claim 1, wherein said (meth) acrylates are esters of acrylic acid or methacrylic acid with monohydric to hexahydric alcohols.

6. The mixture as claimed in claim 1, wherein said esterification product is obtained using an excess of said acrylic or said methacrylic acid; and wherein said excess is subsequently reacted with said epoxide.

7. The mixture of claim 1, wherein said esterification product is obtained using equimolar amounts of said hydroxy compound and said acrylic or said methacrylic acid;

wherein subsequently an excess of said acrylic or said methacrylic acid is added; and wherein said excess is reacted with said epoxide.

8. The mixture of claim 1, wherein said esterification product is obtained using an excess of said hydroxy compound;

wherein subsequently an excess of said acrylic or methacrylic acid is added; and wherein said excess of said acrylic or said methacrylic acid is reacted with said epoxide.

9. A radiation-curable material containing a mixture as claimed in claim 1.

10. A method for curing radiation-curable materials, comprising curing the radiation-curable material as claimed in claim 9 by means of high-energy light or electron beams.

11. A process for the preparation of a mixture of acrylic or methacrylic compounds, containing from 40 to 95% by weight, based on the total amount of the acrylic or methacrylic compounds, of epoxide (meth)acrylates, comprising:

reacting acrylic or methacrylic acid with an epoxide in the presence of an esterification product of a hydroxy compound with the same acrylic or methacrylic acid.

12. The process as claimed in claim 11, wherein said esterification product is obtained using an excess of said acrylic or said methacrylic acid; and wherein said excess is subsequently reacted with said epoxide.

13. The process as claimed in claim 11, wherein said esterification product is obtained using equimolar amounts of said hydroxy compound and said acrylic or said methacrylic acid;

wherein subsequently an excess of said acrylic or said methacrylic acid is added; and wherein said excess is reacted with said epoxide.

14. The process as claimed in claim 11, wherein said esterification product is obtained using an excess of said hydroxy compound;

wherein subsequently an excess of said acrylic or said methacrylic acid is added; and wherein said excess of said acrylic or said methacrylic acid is reacted with said epoxide.

* * * * *